United States Patent
Lee et al.

(10) Patent No.: US 9,924,130 B2
(45) Date of Patent: Mar. 20, 2018

(54) COMPUTER BASED TRAINING TECHNIQUES FOR GEOGRAPHICALLY DISTRIBUTED INDIVIDUALS

(71) Applicants: Yuchun Lee, Needham, MA (US);
Andre Black, Revere, MA (US);
Edward Chin, Canton, MA (US);
Mark Magnacca, Marstons Mills, MA (US)

(72) Inventors: Yuchun Lee, Needham, MA (US);
Andre Black, Revere, MA (US);
Edward Chin, Canton, MA (US);
Mark Magnacca, Marstons Mills, MA (US)

(73) Assignee: Allego Inc., Needham, MA (US)

(*) Notice: Subject to any disclaimer, the term of this patent is extended or adjusted under 35 U.S.C. 154(b) by 671 days.

(21) Appl. No.: 14/315,539

(22) Filed: Jun. 26, 2014

(65) Prior Publication Data
US 2015/0015790 A1    Jan. 15, 2015

Related U.S. Application Data

(60) Provisional application No. 61/846,174, filed on Jul. 15, 2013.

(51) Int. Cl.
| | | |
|---|---|---|
| G06F 15/16 | (2006.01) |
| H04N 5/911 | (2006.01) |
| G09B 5/06 | (2006.01) |
| G09B 19/00 | (2006.01) |
| G06Q 10/10 | (2012.01) |
| H04N 9/804 | (2006.01) |
| H04N 9/82 | (2006.01) |

(52) U.S. Cl.
CPC .......... *H04N 5/911* (2013.01); *G06Q 10/101* (2013.01); *G09B 5/065* (2013.01); *G09B 19/00* (2013.01); *H04N 9/8042* (2013.01); *H04N 9/8211* (2013.01); *H04N 9/8233* (2013.01)

(58) Field of Classification Search
CPC .............................. G06Q 10/101; G09B 5/065
See application file for complete search history.

(56) References Cited

U.S. PATENT DOCUMENTS

| | | | | |
|---|---|---|---|---|
| 7,930,419 B2* | 4/2011 | Mullig | .............. | G06F 17/30017 709/231 |
| 8,340,492 B2* | 12/2012 | Vasudevan | ............. | H04N 5/765 380/204 |
| 8,515,978 B2* | 8/2013 | Kulkarni | ........... | G06F 17/30038 707/756 |
| 8,909,810 B2* | 12/2014 | Caine | ................. | H04N 7/17318 709/203 |
| 9,495,416 B2* | 11/2016 | Kwon | ............... | G06F 17/30038 |

(Continued)

OTHER PUBLICATIONS

Entitled "Iterative Video Optimization for Data Transfer and Viewing," Yuchun Lee et al., filed Jun. 26, 2014.

(Continued)

*Primary Examiner* — Moustafa M Meky
(74) *Attorney, Agent, or Firm* — Fish & Richardson P.C.

(57) ABSTRACT

Computer implemented techniques that involve captured, e.g., self-captured video for educational and other uses such as improving job performance of geographically distributed employees and incremental video optimizations and compressions are described.

22 Claims, 8 Drawing Sheets

(56) References Cited

U.S. PATENT DOCUMENTS

| | | | |
|---|---|---|---|
| 2008/0177752 A1* | 7/2008 | Kulkarni | G06F 17/30038 |
| 2009/0154893 A1* | 6/2009 | Vasudevan | H04N 5/765 |
| | | | 386/207 |
| 2010/0036967 A1* | 2/2010 | Caine | H04N 7/17318 |
| | | | 709/236 |
| 2011/0154192 A1* | 6/2011 | Yang | G06F 17/2288 |
| | | | 715/256 |
| 2011/0246945 A1* | 10/2011 | Caine | H04N 7/17318 |
| | | | 715/835 |
| 2013/0110561 A1 | 5/2013 | Means et al. | |
| 2014/0092127 A1* | 4/2014 | Kruglick | G06F 17/30038 |
| | | | 345/629 |
| 2015/0312634 A1* | 10/2015 | Charania | H04N 21/252 |
| | | | 725/43 |
| 2016/0134602 A1* | 5/2016 | Poornachandran | H04L 63/062 |
| | | | 713/171 |

OTHER PUBLICATIONS

Materials found on May 10, 2017 at http://corp.kaltura.com no other date found.

Materials found on May 10, 2017 at http://www.knowledgevision.com/ copyright date 2017.

Materials found on May 10, 2017 at https://www.panopto.com/features/ copyright date 2017.

Materials found on May 10, 2017 http://www.videotrope.com/ copyright date 2008-2009.

Materials found on May 10, 2017 http://www.vidizmo.com/ copyright date 2017.

\* cited by examiner

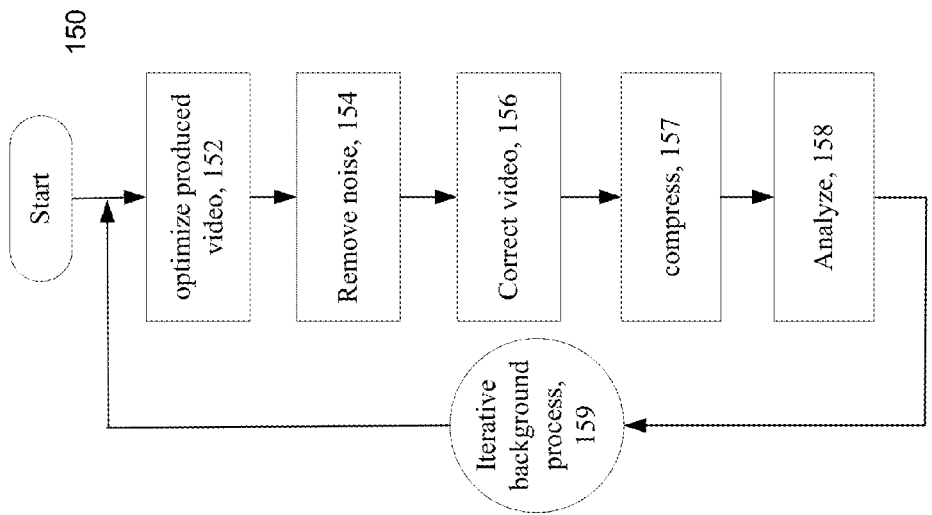
FIG. 5
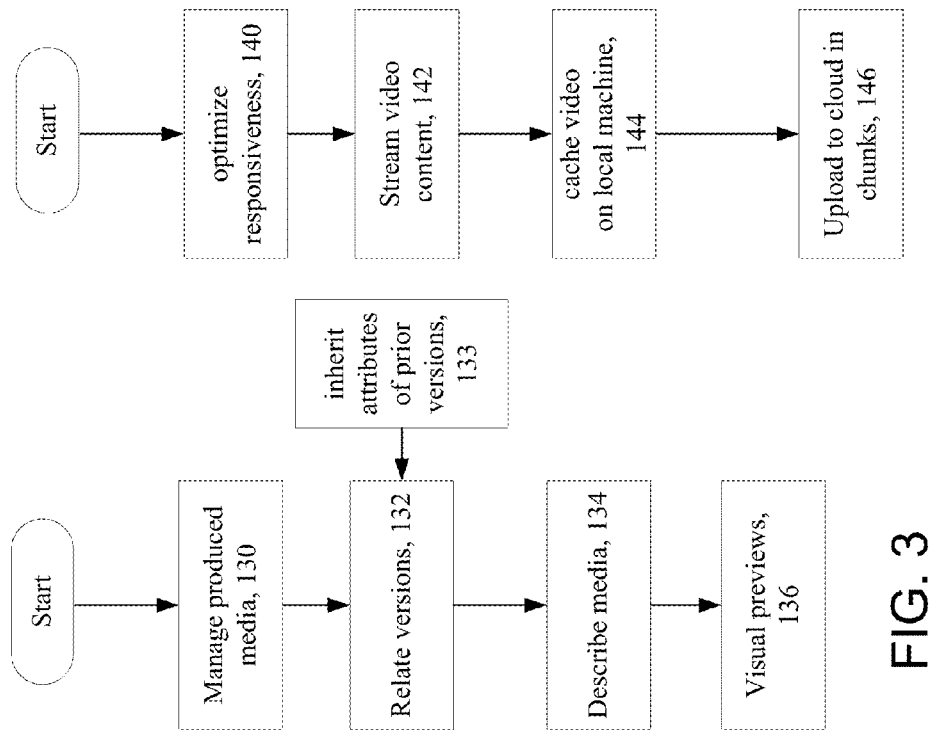
FIG. 4
FIG. 3

COMPUTER BASED TRAINING TECHNIQUES FOR GEOGRAPHICALLY DISTRIBUTED INDIVIDUALS

CLAIM OF PRIORITY

This application claims priority under 35 U.S.C. § 119(e) to provisional U.S. Patent Application 61/846,174, filed on Jul. 15, 2013, entitled: "Computer Based Training Techniques for Geographically Distributed Individuals", the entire contents of which are hereby incorporated by reference.

BACKGROUND

This invention relates to training methodologies and more particularly to computer implemented training methodologies.

Geographically-distributed employees that have responsibilities that include face-to-face customer interactions often may be challenged in consistently delivering approved corporate messaging with polished delivery that is appropriate and compelling for their customers. Many corporate training programs involve intensive "boot camp" type of engagements, i.e., typical practices such geographically-distributed employees, e.g., a sales force travel to a common geographical location that is out of the sales field and where these employees are isolate for intensive training. Typically, these boot camp type training programs run for a finite time, conclude, and are often not repeated at least for the same topic under the assumption which may not be fully verified that the person has absorbed the information.

SUMMARY

Boot camp types of training can be expensive, infrequent, and most importantly takes the employee out of the field for several days, which may not be the most productive use of an employee's time. Often after such boot camp training many trainees forget some or much of what was learned. Managers of distributed employees have problems providing feedback to employees and do not have the ability to observe employee interactions with customers. Product messaging from employees thus is likely to vary from customer to customer which could constitute a corporate compliance issue and a major training burden. Also, the emotional connection and compelling delivery that accompanies the messaging is likely to vary from employee to employee, which would constitute a serious management issue for a manager to be able to assess and then correct through coaching and further observation.

According to an aspect of the invention, a computer program product tangibly stored on a computer readable hardware storage device includes instructions for causing a processor to capture video and voice media files of a user, securely upload a media file to a server, receive annotations and other feedback on the uploaded media, and render the uploaded media on a display of a device with the received annotations rendered as an overlay on the media, and rendered at a timeline of the media that associates the comment with a portion of the media at that timeline.

According to an additional aspect of the invention, a computer-implemented method includes capturing by a client device comprising image and voice to provide personal media content, securely uploading the personal media content to computer storage, receiving subsequent to the uploading by the client device annotations and other feedback embedded in the personal media content, and rendering the uploaded media on a display of the client device with the received annotations rendered as an overlay on the media, and rendered at a timeline of the media that associates the comment with a portion of the media at that timeline.

According to an additional aspect of the invention, a system includes a processor and memory storing a computer program product, the computer program product including instructions for causing the processor to capture video and voice media, securely upload the media to a server, receive annotations and other feedback on the captured media, and render the uploaded media on a display of a device with the received annotations rendered as an overlay on the media, and rendered at a timeline of the media that associates the comment with a portion of the media at that timeline.

The following are some of the embodiments within the scope of the above aspects.

The above aspects can allow for sharing of the personal media content with specific recipients. The above aspects can capture self-captured video and audio, and apply a positioning outline template over a display to assist a user to align an image capture device with an image of the user. The above aspects can apply presentation slides to images of the media content. Video can be self-captured video.

According to an additional aspect of the invention, a system includes a processor and memory storing a computer program product including instructions for causing the processor to apply a set of batch processes over multiple passes to extract search terms that users can use to perform searches, receive video and voice media files from a user, distribute the received video and voice media files of the user to other users, receive annotations and other feedback on the distributed media from other users, overlay the received annotations on the media at a timeline of the media that associates the comment with a portion of the media at that timeline, and store and index the media with the received overlaid annotations.

The following are some of the embodiments within the scope of the above aspect.

The processor is configured by the program to share the personal media content with specific recipients. The processor is configured by the program to receive a request to view a stored media from a potential viewer and determine whether the potential viewer has sufficient privileges to view the requested stored media. The processor is configured by the program to receive a request to view a stored media from a potential viewer, determine whether the potential viewer has sufficient privileges to view the requested stored media and feedback produced from other users.

One or more of the following advantages may be provided by one or more of the above aspects.

The above aspects provide techniques to enable managers to coach users. Managers can be more assured that messaging, such as a product descriptions are absorbed and used consistently by users, by virtue of captured visual information and timely feedback. The techniques described below also avoid pulling users out of working situations for formalized training meetings, such as sales meetings. These techniques allow managers to spot user performance issues quickly and provide personal coaching to work towards continuous improvement without unmanageable levels of travel.

According to an additional aspect of the invention, a system includes a processor and memory storing a computer program product including instructions for causing the processor to apply a set of batch processes over multiple passes to optimize the video, by configuring the processor to, remove noise from the video, correct the video by visually aligning frames of video to remove handshaking movements; and compress the video to produce smaller file sizes.

The following are some of the embodiments within the scope of the above aspect.

The processor is configured by the program to incrementally execute the functions of the program. The processor is configured by the program to incrementally execute the functions of the program as a background process. The processor is configured by the program to analyze the media to determine whether the process should produce another incremental optimization. The processor is configured by the program to extract a set of terms from the file, analyze the set of terms extracted from the file to determine whether the extracted terms can be used as search terms, and produce a new set of search terms from those extracted terms that can be used as search terms according to the analysis.

One or more of the following advantages may be provided by the above aspect.

The above aspect provides techniques that can improve quality of media comprising video files by application of the batch processes over multiple passes to incrementally improve the quality of the video media, and compress the video to smaller file sizes. These optimizations remove noise from the video and correct the video by visually aligning frames of video to remove handshaking movements and compress the video to produce smaller file sizes. Any conventional optimization algorithm and conventional compression algorithms can be used and repeated over several iterations.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3-5 are flow charts of processes in the training software.

DETAILED DESCRIPTION

Described below is an integrated information and communication platform 10 "platform 10" that enables users to produce video, e.g., by a videographer, who may be the employee in a self-recorded video (e.g., a self-captured video) that is uploaded to a server/database for access by e.g., managers and other users. In the platform 10, users consult with an expert service provider even when the two parties are geographically separated. Part of the efficiency involved with using the platform described below for surveying of offsite employee performance and improving job performance of geographically distributed users involves a verification of eligibility process to identify eligibility of users for access to services/files.

Figure 1:
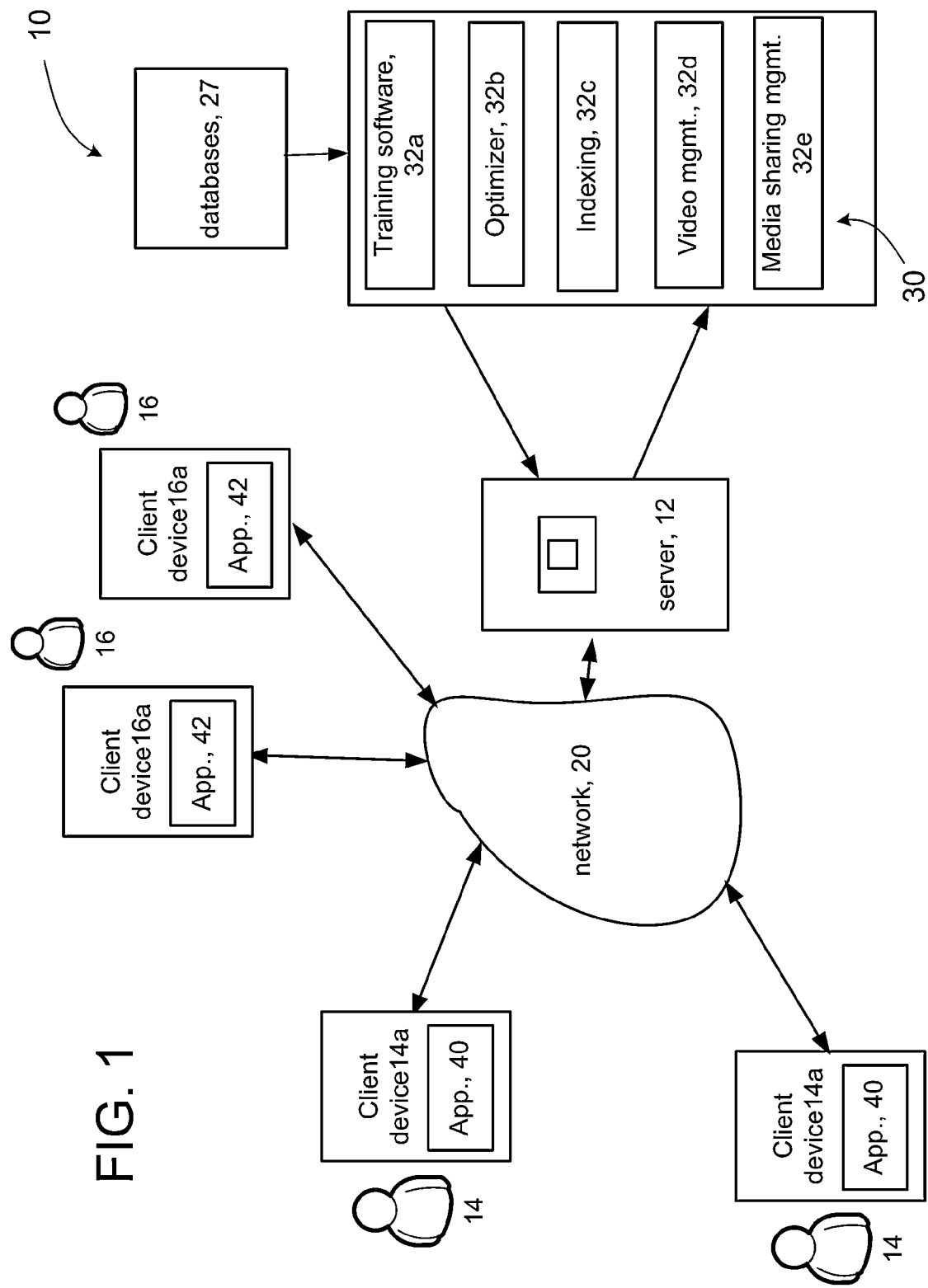
FIG. 1 is a diagrammatic view of a networked system executing training software.

Referring now to FIG. 1, an exemplary networked computer platform 10 that includes functionality for surveying offsite employee performance to collect feedback, and in particular for improving job performance of geographically distributed users is shown. The platform 10 includes a computer server system (server) 12 for processing of captured video sent of users 14, and taken, e.g., with client systems 14a or other video systems. Captured video is processed and stored in a database via server 12 that can be accessed by managers (e.g., supervisors or trainers and the like) 16 via client systems 16a. The server 12 includes an application or a web browser acting as a client utilizing an instance of a hosted application on a web server.

The platform 10 also includes a database 27 containing configuration settings, information, and media, such as the self-captured video. The server 12 executes management software 30. The management software 30 includes several functional components. One component is training software 32a for employee practice and performance improvement. Another component is an optimizer that optimizes video for faster retrieval. Also included are indexing software 32c and video management software 32d that capture media (e.g. self-portrait video) and that incorporate video and voice, and in some implementations presentation slides (e.g., Microsoft PowerPoint) into a single instance of integrated media content, referred to as a "take." The management software 30 includes video sharing management software 32e that allows users to select one or more other users in order to share their media, e.g., takes with those users. The video sharing management software 32e includes functionality for securely sharing selected media over a network to selected groups of users. The training software 32a also includes functionality that allows for serial practicing of takes, including inheriting metadata from previous, related takes to simplify the training process.

Client devices 14a and 16a can be any combination of, e.g., personal digital assistants, cell phones, computer systems, media-player-type devices, tablet computers and so forth. The client devices 14a enable the users 14 to input and receive information as well as to upload video and audio and/or text to the server for use by the managers 16 (and/or other users). The client devices enable the managers 16 (or other users at clients 14a) to download the video and input information to the downloaded video as audio/text annotations that along with the video uploaded to the server 12 are used by the user 14, the manager 16 and/or other users as part of training and/or surveying processes.

In one embodiment, the platform 10 is implemented in a cloud-based environment, for long-term storage and management of captured media and servers in the cloud have instances of the management software 30 execute on those servers 12 to analyze the captured media to generate useful metadata and previews to allow users to find specific media, and distinguish specific media from other similar media easily and reliably.

In some embodiments, the optimizer portion 32b of the management software 30 is used for the cloud-based background processing to incrementally compress the media to ever-smaller file sizes for faster transport across networks. The cloud-based background processing incrementally extracts search terms from speech and text embedded in the media (e.g., from the audio stream of a video or the textual elements in an embedded presentation). This extraction allows users to share media as well as discover non-private media (e.g., via searching or subscribing to dynamically updated topical "channels") and allows annotation and feedback for capturing shared media (e.g., audio or text comments, free-form or guided via scorecard surveys). In addition, the server 12 and platform 10 generally includes functionality for discovery of feedback given on shared media and to analyze trending of positive or negative feedback for employees over periods of time.

A network-capable portable computer system (such as a tablet device) includes an application for executing software 40 for employee practice and performance improvement. Alternatively, computer systems may utilize web browsing software to act as a client that utilizes an instance of a hosted version of the same/similar application functionality. Many such instances of these applications are used to interface with networked databases 27 that store information and media for the applications.

Figure 2:
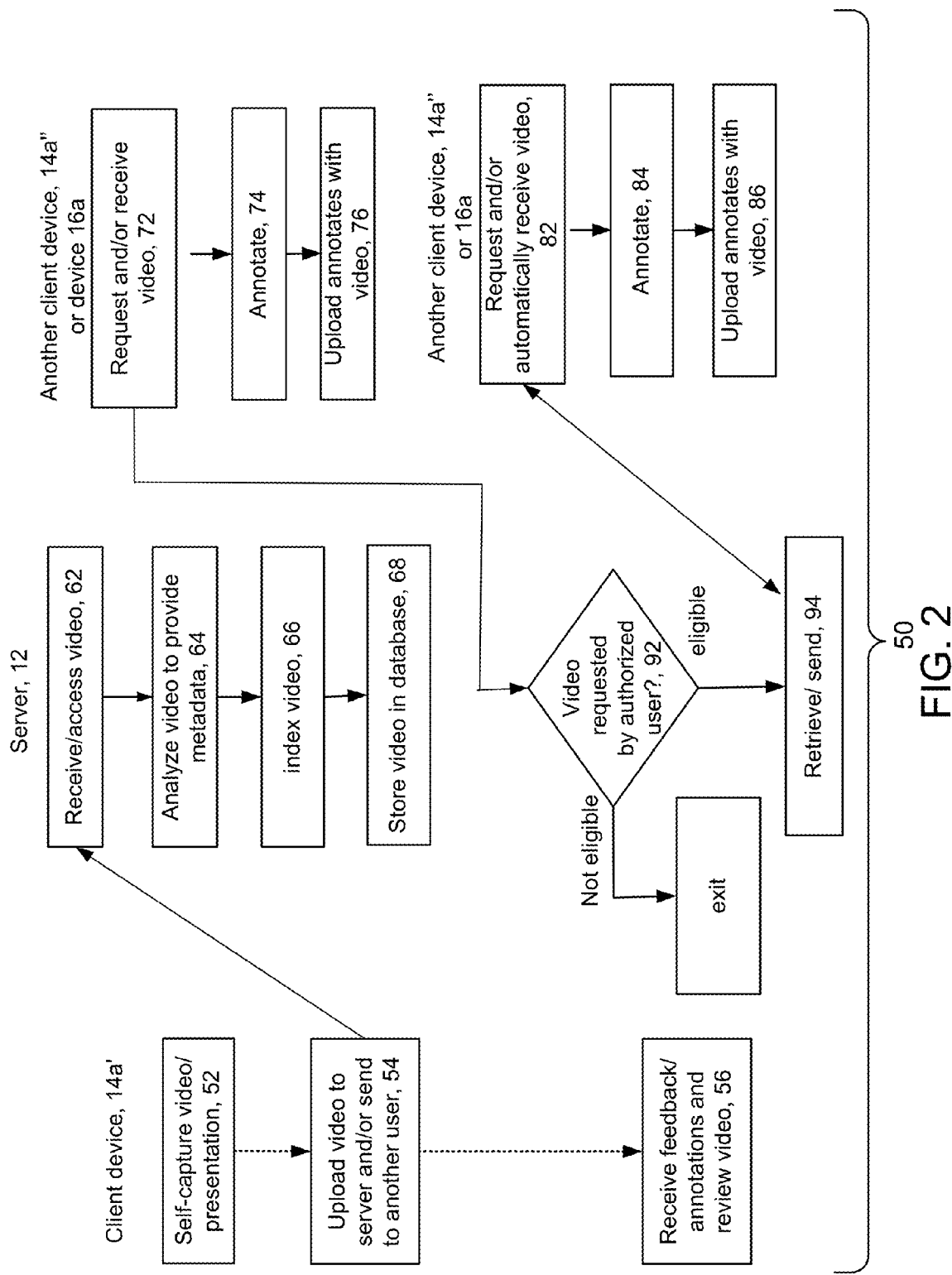
FIGS. 2 and 2A are flow charts useful in understanding a training processing.

Referring now to FIG. 2, an overall computer implemented coaching process 50 is shown. Three different systems are involved in this implementation of the coaching process; a client device 14*a*' of a user, (e.g., one of the client devices 14*a* FIG. 1), a server e.g., server 12 (FIG. 1) and a client device 14" of a different user, (e.g., another one of the client devices 14*a* FIG. 1) or alternatively one of the client device 16*a*.

In one implementation, a user at client device 14*a*' self-captures 52 one or more examples of media that depict elements of his/her capabilities and performance in job-related interactions (for example, videos and audio of themselves presenting a pitch of a product using presentation slides, which will be presented to customers). The media is uploaded 54 to the server/database and/or sent (not shown) immediately to another user, e.g., a manager, from the client device 14*a*'. That client device 14*a*' receives feedback 56 and other annotations from other users at other client devices, e.g., 14*a*".

In the server 12, the media is accessed or received 62 and analyzed 64 to produce meta-data that describes the media. The server 12 also indexes 66 the media for easy discovery and retrieval and stores 68 the media. The metadata is provided by algorithms that extract information from the video and/or can be manually entered. The user may select one or more other users in order to expose their media to those users. Other users with permissions to do so may discover the newly shared media and view, listen to, or read that media and can comment to provide feedback. Users receive the feedback on the client device 14*a*' about the media they shared with other users.

Other users at client devices 14*a*" or 16*a* request and/or receive 72 the stored media, as shown. These other users annotate the media and upload their annotations to the database, via server 12. The annotations can be uploaded on the video and or separate from the video.

A user at client device 14*a*' will see that new feedback has been logged, and can view, listen to and/or read that feedback in context with the media. Based on feedback, the original author may choose to produce subsequent improved versions of the media. The feedback can originate from various sources, such as peer users, supervisors, managers, etc.

In some implementations, authentication and/or privileges may be required for certain users to view the stored media and/or feedback produced from other users by client devices 14*a*" and/or 16*a*. In that situation, requests are sent to the server 12 and the server 12 determines 92 whether the user has the requisite privileges to view the annotations and/or an authentication process to authenticate the user requesting access. If the user is eligible to view the stored media and/or feedback produced from other users, the stored media and/or feedback is retrieved and sent 94 to the user at device 14*a*"; otherwise if the user is not eligible, the process can exit.

Some users may be automatically privileged to view the video and all feedback, e.g., managers, using still another client device (e.g., client device 16*a*, FIG. 1). Typically, these users are automatically sent 80 the video for real-time annotating that is sent back the user on the client device that provided the original self-captured video.

Figure 2A:
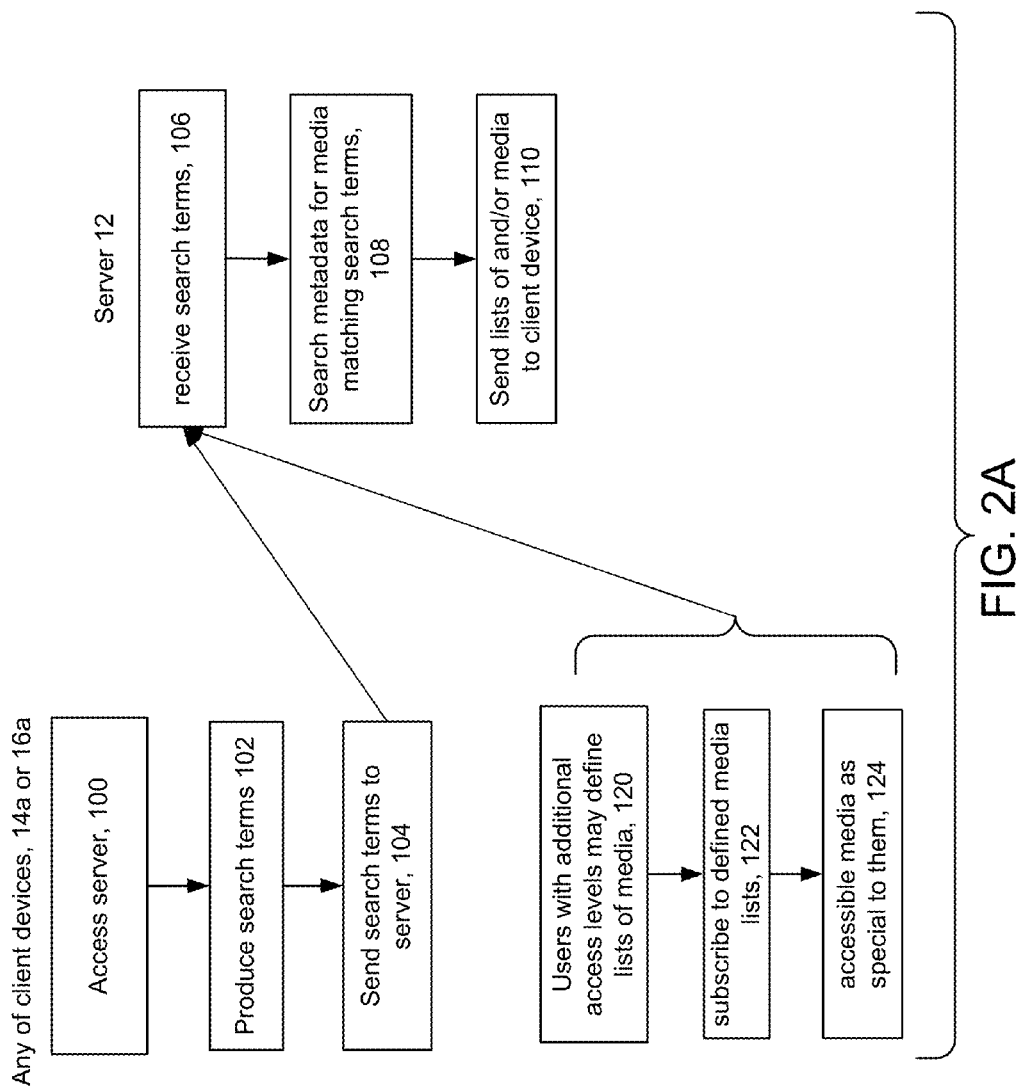

Referring now to FIG. 2A, any of the users will be able to search for one or more accessible media items that match their desired criteria by searching on produced metadata. Users access 100 the server 12 and input search terms 102. The search is sent to the server 12. The search is received 106 by the server 12, and the server 12 can store the search and search terms. Stored search criteria can be used to monitor for additional items that match or closely match those criteria at various points in time. With the search terms, the server 12 searches 108 the metadata store for takes, and other video that match or somewhat match the search terms, and sends 110 either lists of and/or videos to requesting client device 14*a* or 16*a*.

Users with additional access levels may define 120 lists of media, individually or via criteria, for other users to consume. Other users may subscribe 122 to defined media lists to easily monitor them for updates and new entries over time. Users may designate 124 any accessible media as special to them (e.g. as a favorite item that they can easily retrieve in the future, or as something they wish to queue for offline review).

The video sharing management software 32*e* enables easy sharing of produced media selectively and widely. The video sharing management software 32*e* allows media to be associated with individual recipients or named lists of recipients. The video sharing management software 32*e* allows users with additional access levels to produce those named lists of recipients, e.g., participating employees, for use in share and access control. The video sharing management software 32*e* has options to keep media entirely private, i.e., to allow the author to designate the media as accessible only to themselves. The video sharing management software 32*e* includes a process to announce certain classes of media to all participating and authenticated employees by designating the media as accessible to everyone at their company.

When media is shared and accessible to other users, those users discover the media when searching for terms or codes that appear in the media's descriptive information (i.e., metadata) such as its keyword tags or its title. Media authors, or users with additional access levels, may associate keyword tags with the media specifically for the purposes of having that media show up in media lists that are to be consumed by other users. Membership in those lists supersedes any other access limitations that would have prevented list subscribers from accessing the media. Regardless of the methods used to share media, the author will be able to visually distinguish items that are private from items that can be viewed by other users.

Referring now to FIG. 3, the management software 30 includes employee training software 32*a* for managing 130 produced media and processes that allow media authors to relate 132 subsequent versions of captured media to prior versions as part of a related series of attempts of a presentation. The software 32*a* includes processes to describe media 134 with standard attributes such as titles, descriptive keyword tags, prose descriptions, and produce visual previews 136 (e.g. thumbnail images that capture a single key frame of video). The employee training software 32*a* is useful for employee practice and performance improvement, as well as employee surveying.

The media may additionally be described with custom attributes that vary for each deployment of the software. The version process 132 for managing a related series of attempts to produce desirable media, allows new members of that series of attempts to inherit 133 the descriptive attributes of the earlier members in the series. The employee training software 32*a* manages produced media in a library of media organized by the author in one of a number of ways (e.g., by recency or groupings of related series of attempts).

Referring now to FIG. 4, the management software 30 includes optimizer processes 32*b* for automatically optimizing the responsiveness of the experience for users producing and consuming media. The optimizer software 32*b* includes modules to stream all video content using adaptive bit rate HTTP Live streaming (HLS) to provide the user with the optimum quality of service allowable within any local network with varying bandwidth, whether it be cellular or WiFi. Optimizer software 32*b* automatically caches streamed media on internal storage of the computer system (e.g. tablet device) for fast viewing at a later date, without the need for a network connection to be present at that later date.

All descriptive data (e.g. titles, descriptions, or preview images) for media is cached on the internal storage of the computer system, and requests to refresh that data are only made to the cloud server when there have been changes to the metadata in the cloud server storage system 146. This chuck approach to updates, conserves bandwidth, and minimizes network resource contention issues. All media items of significant digital size are uploaded to cloud servers in chunks so that intermittent network disconnects would not require the entire media item to be transferred again from scratch. This conserves bandwidth and could ensure that shared media reach their intended recipients as quickly as possible.

Referring now to FIG. 5, media that has been stored whether on a stand-along server 12 or especially in/to the cloud server environment is subjected to a set of batch processes 150 that will make multiple passes over time to extract search terms that users can later use to perform search and find the media. Media in server 12, e.g., the cloud server environment optimize the video by clean up image, 152 removing noise 154, correcting video by visually aligning frames of video to remove hand shaking movement 156, compress 157 the video to produce smaller file sizes, and analyzing 158 the video for further improvement on an iterative basis 159 over time. Server 12, e.g., a cloud-based server environment, uses any known algorithms for cleaning up image, removing noise, correcting the video, and compressing the video. Each iteration can be followed by the analyzing 158 the video to determine whether the can be further improvement. Processes will also compress video, audio, presentation slides, and other forms of data captured in integrated media.

The process 150 can improve quality of media comprising video files and associated comments by application of the batch processes using multiple passes to incrementally improve the quality of the video media, and also extract more search terms from both the video and comments, which users can use to perform searches. These optimizations that remove noise from the video and correct the video by visually aligning frames of video to remove handshaking movements and compress the video to produce smaller file sizes can use conventional algorithms that are repeated over several iterations, as discussed above. The server extract a set of terms from the media and or comments and analyzes the set of terms extracted from the file to determine whether the extracted terms can be used as search terms (e.g., are they appropriate, are they new, using various other criteria, etc.) and produces from the terms that can be used a new set of search terms that are subsequently stored. The system incrementally executes the program, e.g., as a background process on the server 12. The server 12 is configured to analyze the media to determine whether the process should produce another incremental optimization.

This multi-pass process ensures that the current best version of any media is always available for viewing and downloading, while over time that same media item will be even more optimized and compressed for faster downloads and more pleasing viewing. The multi-pass processing is executed incrementally, e.g., in some implementations as a background process during slow times, so the fastest indexing process can be performed quickly to allow immediate access to the media. Over time, more sophisticated processes can be executed to extract a richer set of search terms using text recognition and speech recognition, in order to balance access speeds with ever-improving search results quality. The training software 32*a* also includes software processes for improving the richness and quality of produced media.

Figure 6:
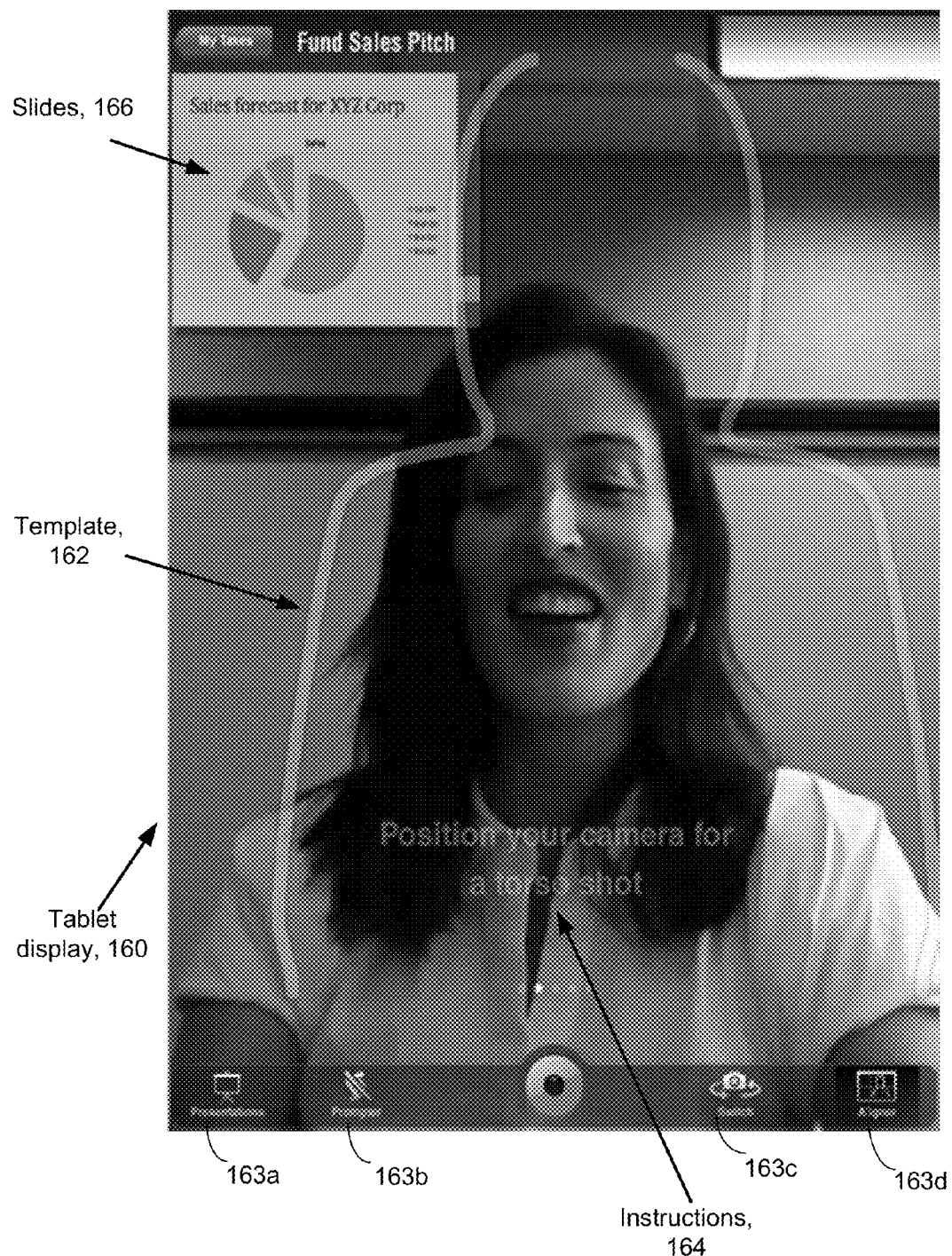
FIGS. 6-9 are diagrams of screenshots of graphical user interfaces.

Referring now to FIG. 6, a process for ensuring proper composition and lighting of recorded video media allows the videographer, who may be the employee in a self-recorded video to access visual alignment template guides. The device is configured to access pre-defined templates that produce an outline of the desired position of a subject relative to the presentation, as shown. An image of the user displayed on a monitor of a tablet computing device 160, as taken through a camera (not shown) on the tablet computing device 160 has superimposed over the image a template outline 162. The display has four controls 163*a*-163*d* on the bottom that allow the user to select, respectively, a presentation to display on the tablet, a prompter <what does this do?>, a switch <what does this do?>, and an aligner to display the template.

The user can use the template outline to adjust the position of the image capture device on the tablet to correctly position the user in the image. The device can depict instructions 164 as text. The template guides are used to indicate ideal camera positioning, subject positioning (shown), light source positioning, and positioning for any visual aids that may also be included in the video.

The training software 32*a* allows uses to include presentation slides 166 in their recorded media via control 163*a*. A user selects a presentation slide set that resides on their local drive from within the software or accesses the presentation slides in email attachments or through web page links, etc., and opens the presentation in the training software 32*a*. Alternatively, from within the software, the employee may select presentations that reside in secure internet database services for which they have credentials. Users may authenticate to those internet services from within the software in order to produce a persisted linkage between the internet service and the training software. If the secure internet service utilizes folder hierarchies to organize files, the shortcut links can be automatically produced to access most frequently accessed folders in order to avoid navigating the folder hierarchy frequently.

Once a presentation has been associated with a video recording, the employee will be able to move forwards and backwards through the slides as they record or jump to a specific slide number of their choosing. The employee may also choose to display annotations and notes from within the presentation files as teleprompter notes. During recording, the on-screen controls and the on-screen display of the presentation are all aligned and oriented so that the on-camera subject does not appear to be distracted as they capture their performance. When the recording is later viewed or shared, the presentation appears as part of the recorded media, but all other tools and prompters are not displayed to the viewer.

Figure 7:

Referring now to FIG. 7, the training software 32a manages feedback on media, as discussed above. The training software 32a allows a user to use minimal physical interactions (e.g. a single tap of the finger) to immediately record a vote in region, e.g., a scorecard 172 expressing their approval or disapproval (typically operating on client devices of other users, e.g., 14a" or 16a) above a specific sub-section within the media.

In addition to this vote-like feedback 172, a reviewer may also choose to associate additional free-form comments 174 with their approval or disapproval. These comments 174 may be typed using a keyboard or they may be dictated as audio. In some embodiments that comments may be recorded as video. Comments 174 can be viewed serially as shown in FIG. 7 or stacked. In some implementations, the comments 174 are synchronized to, that is associated with a specific time of the video as shown to pinpoint the comments with the presentation.

Feedback on a single media item may have many such points of feedback, mixing freely between the various mediums of commenting. A reviewer is guided by the, e.g., company-configured, scorecard 172 as they author a more structured feedback report to be recorded for the media. Users with additional access levels will be able to define scorecard templates for a company such as a list of criteria that can be scored, along with terms that help to interpret a numeric or star-rating score that is to be captured for each criterion.

Scorecard templates 172 can also include a dynamic number of free-form comment fields with custom prompt messages, as shown. When filling out a scorecard, reviewers will receive immediate visual feedback on the numeric or star-rating scores that they enter so that they can confirm they are accurately representing their opinions and feedback.

The server 12 analyzes scores received in the scorecard feedback, and thus normalizes feedback from different reviewers because of guidance provided by the scorecard templates. Employees can visualize the different amounts of positive and negative feedback that has been recorded for specific discrete regions within media. In the case of media that are associated with a playback timeline, such as video or audio media, this may take the form of a histogram (not shown) that appears with the media seek bar timeline. Within the histogram, bar heights and colors would correspond to the number of positive and negative votes associated with a time range within the media.

Users, e.g., employees can retrieve specific feedback items and comments in context within the media. In the case of media that is associated with a playback timeline, such as video or audio, this may take the form of a secondary timeline at a different zoom factor that is overlaid atop the media and the main playback timeline. Because of the different zoom factors, this second timeline would advance visually at a faster or slower rate than the main seek bar timeline, accomplishing a parallax animation effect, i.e., display a displacement or difference in the apparent position of the image with respect to the comments due to the two different timelines.

Comments and feedback recorded by reviewers would be displayed along the second timeline at positions corresponding to the time index to which the feedback pertained. For time indices that received lots of feedback, additional visual compression techniques (e.g. simulated 3-dimensional rotation of comment cards that could then appear stacked back-to-front) would indicate that more comments are available to be viewed, and allow the user to use additional gestures or actions to view each of those comments in turn.

Media authors would be made aware by the server 12 when new feedback has been recorded for their media. Media authors can receive notifications using the mechanisms inherent to their operating systems or web browsers stating when new comments are recorded. Media authors can also see a persistent count of the number of media items that have feedback that has been recorded since the last time they checked their media for feedback. Each media item that has received such feedback also visually indicates that is has new unseen feedback items waiting to be viewed. When the author viewed the media item and its feedback, the appropriate counters are decremented and visual indicators are cleared away.

Figure 8:
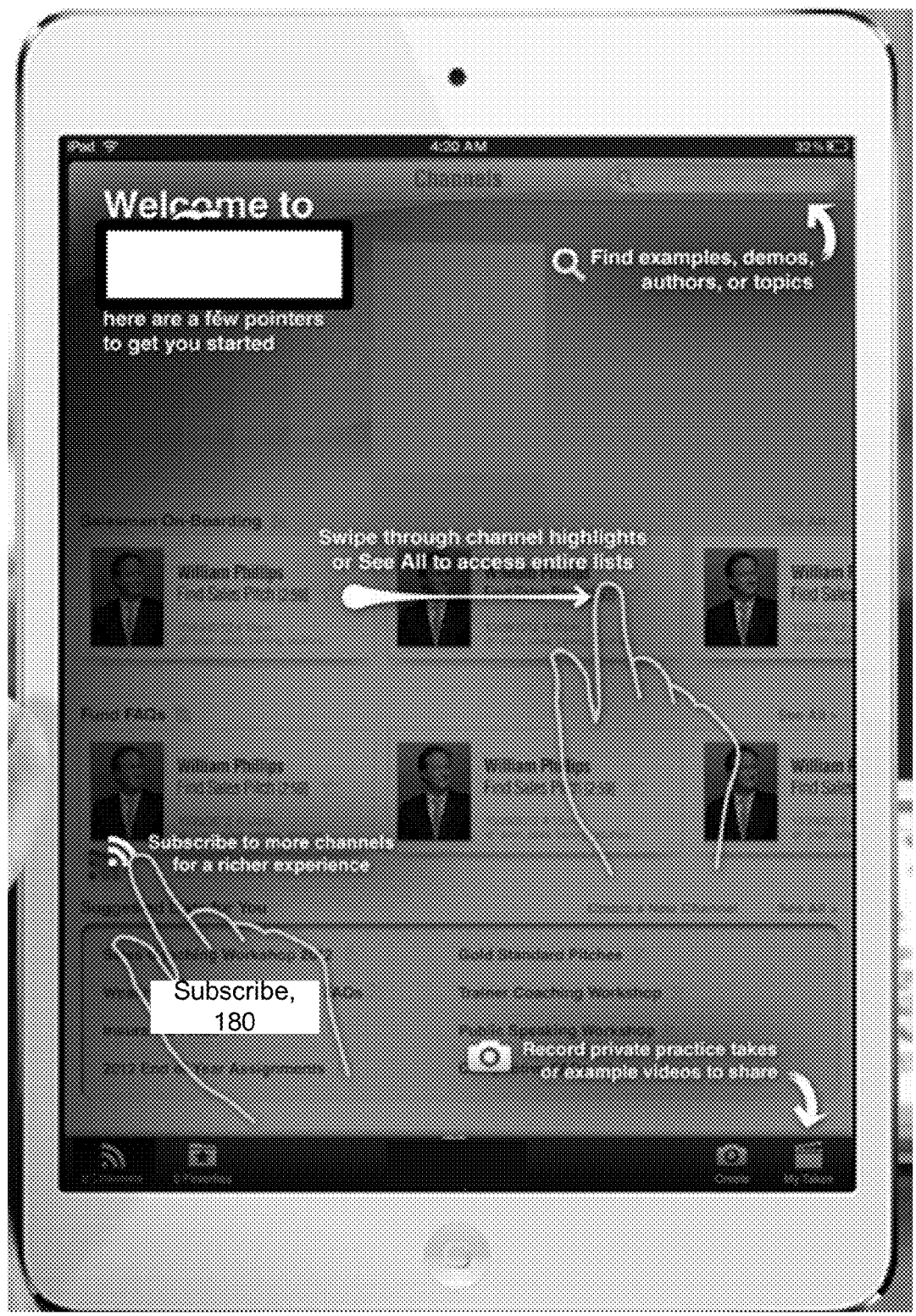

Referring now to FIG. 8, the training software 32a includes software processes for allowing the curation, i.e. the collection and preservation of shared media. A visual best practices interface has depictions of various user published videos that are arranged in channels that can be subscribed to. The training software 32a allows managers and subject matter experts to publish sets of media into shared lists so that other employees may subscribe to those lists and consume the media, as shown in FIG. 8 as item 180. Users with additional access levels may produce new media lists by specifying a name for the list. The lists may also capture a longer description and descriptive keywords tags. At any time in the life of a media list, users with additional access levels will be able to add additional media to the list. Such users may select specific media entries one at a time or in bulk for such addition and specify search criteria that will make the entries of the list the dynamic set of media items that match those criteria at the time when a list subscriber attempts to view the contents of the list.

At any time in the life of a media list, users with additional access levels will be able to remove media from the list. They may select media items in the list one at a time or in bulk to remove them. They may also revise the search criteria for dynamic lists in order to exclude items from the list. A process allows employees to discover all of the lists that are shared within their company's data and subscribe or unsubscribe from those lists.

An employee can browse through available lists by name and view descriptive information about each list. They can then choose to subscribe to the list, or unsubscribe if they were already subscribed. Subscription to a list will make the contents of the list more easily accessible from prominent views within the employee practice and performance improvement software. Employees can also unsubscribe from a list by accessing its entry on the prominent view and taking an action to unsubscribe in that context (e.g. tapping a trash can icon to queue that item for removal.)

The training software 32a includes software processes for allowing the discovery of media during times of urgent need. An employee can search for media items or media lists by entering search keywords, author names, titles, Boolean queries, or natural language questions. Reading, viewing, or otherwise consuming the media items that result from such a search should be a concise way for an employee to receive and retain information in the best terms, as chosen by their employee peers, managers, and subject matter experts. An employee will be able to save that search query as a dynamic media list so that they can consume new resulting media items from prominent views within the employee practice and performance improvement software.

The training software 32a software includes software processes for compensating in a positive way for network or server outages. The architecture of the cloud services is designed to have no single point of failure. Multiple instances of each major component exist and work independently and in parallel. The underlying database has a standby database readily available and in sync so that the end user should not be impacted by database failure. The architecture of the training software 32a uses third-party services (e.g. Amazon Web Serves) that provide capabilities of scaling bandwidth, processing power, or memory capacity of components to match escalating load. If a network connection is unavailable from an employee's computer system (for example, when the employee is traveling by airplane), the client application still allows access to valuable functionality and to previously cached media items for viewing and providing feedback and annotation. For any new data, media, or feedback that is produced while the employee does not have access to a network connection, the employee practice and performance improvement software will queue those changes for transmission as soon as a network connection is reestablished.

Unlike prior techniques, e.g., combinations of telephone calls, emails with video and PowerPoint attachments, and an enterprise sharing infrastructures, which such prior solutions do not address issues of secure sharing (where they never run the risk of outside companies seeing their privileged information), detailed commenting on specific time indices within a video, guided scorecard-style commenting, automatic versioning, analysis of improvement over time, ability to view and produce media offline, compression and analyzing these media incrementally in the cloud, standardized scoring feedback.

Technology offerings that could be used for such prior manual processes have technical shortcomings such as inability to produce video files compressed small enough to transfer over the network, inability to automatically produce search terms from text and from speech and video images, hard to index the media for later retrieval and search, poor network failure handling that leads to loss of video data, inflexibility to support optimum viewing over varying network bandwidths, inability to view videos offline at all or without explicit download of videos ahead of time and no secured and controlled access to the content produced.

User of the training software 32a can very quickly improve their performance and professional image of presentations. The training software 32a can be used to practice for sales pitches of products that are technically, scientifically, or financial complex, and can be used with new sales hires, and underperforming sales reps to train, accurately assess and coach. With the training software 32a companies can use the software to institute remote or distributed sales "boot camp" programs where Sales Managers and Product Managers and professional sales or presentation Coaches will be able to review recordings made by sales team members. They will then be able to provide feedback and coaching that will very quickly steer those reps towards a better ability to deliver the company's key product and brand messages in ways that engage their target audiences. Beyond training, companies can build repositories of "best examples" and "best practices" for people pitching products and services, and give verbal responses to difficult questions or competitive pressures.

Companies may also choose to use the employee practice and performance improvement software's flexible and non-restrictive capabilities for other video capture and sharing purposes. The training software 32a could easily be used for a periodical podcast series' where employees share useful or engaging video content with each other. Companies could also use the employee practice and performance improvement software for remote asynchronous town-hall-style question and answer sessions. Companies could also conduct employee competitions for "best video around topic X" or conduct video polls where employees could vote via annotations and feedback posted on videos as a way of expressing preference for one way of delivering a message versus another.

Figure 9:
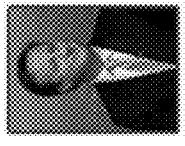

Another user interface is shown in FIG. 9, as a "share takes" interface 195 that includes a depiction of a title and description 195a (option), with topic tags 195b and access privileges selections, via a pull down list 195c with a control that notifies users via e-mail of an available take to view. Also included is a pane with a search box 195d that can bring up names or addresses that are added to a listing 195e of users to share the take with. The data from this interface, e.g., tags, description, and list are associated with the title of the take in the server 12 and used by the server 12 for determining whether an individual can access the take.

A suitable cloud architecture is any commercially available architecture. When upload to the cloud a client device initiate publish API call is made to upload the content meta data that is persisted in the database. A publish content chunks API call is made to upload the video chunks of uniform size, e.g., 128 Kbytes or other suitable sizes. The file chunks are persisted in the cloud.

Embodiments can be implemented in digital electronic circuitry, or in computer hardware, firmware, software, or in combinations thereof. Embodiments can be implemented in a computer program product tangibly stored in a machine-readable (e.g., computer readable) hardware storage device for execution by a programmable processor; and method actions can be performed by a programmable processor executing a program of instructions to perform functions of the invention by operating on input data and generating output. Embodiments can be implemented advantageously in one or more computer programs executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory and/or other hardware storage devices. Generally, a computer will include one or more mass storage devices for storing data files; such devices include magnetic disks, such as internal hard disks and removable disks; magneto-optical disks; and optical disks. Hardware storage devices suitable for tangibly storing computer program instructions and data include all forms of volatile memory, e.g., semiconductor random access memory (RAM), all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of embodiments of the invention have been described. The embodiments can be put to various uses, such as educational, job performance enhancement, e.g., sales force and so forth. Nevertheless, it will be understood that various modifications may be made without departing from the spirit and scope of the invention.

What is claimed is:

1. A computer program product tangibly stored on a computer readable hardware storage device, the computer program product comprising instructions for causing a processor to:
    generating a positioning outline template that is rendered on a display of a user device for assisting a user in aligning a video capture device with an image of the user as rendered on the display for self-capturing video of the user;
    capture self-captured video and voice data to produce a media file of the user;
    securely upload the produced media file to a secure database server;
    receive from the secure database server, the produced media file that includes one or more annotation comments that are rendered on a display device as an overlay on the produced media rendered from the produced media file, with the annotation comments rendered at one or more timelines of the media that synchronizes the annotation comments with corresponding portions of the media at that one or more timelines.

2. The computer program product of claim 1 further comprising instructions to:
    receive credentials for a selection of recipients for which the produced media can be shared;
    securely upload the produced media file and the credentials of the selection of recipients to the secure database server;
    receive a request to share the produced media content; and
    authenticate the request by determining that the request is from a user in the selection of users for which credentials were received.

3. The computer program product of claim 1 further comprising instructions to:
    execute a search for video files on the database server according to search terms derived from the one or more annotation comments.

4. The computer program product of claim 1 further comprising instructions to:
    receive a selection of a locally stored set of one or more presentation slides; and
    incorporate content from the selected one or more presentation slides into images of the media content of the produced media file.

5. The computer program product of claim 4 further comprising instructions to:
    generate the positioning outline template to render by the display device to assist the user to align the video capture device with the image of the user and the one or more presentation slides incorporated into the media file.

6. A computer implemented method comprises:
    generating a positioning outline template that is rendered on a display of a user device to assist a user in aligning a video capture device with an image of the user to assist in producing self-capturing video of the user;
    capturing by a client device, self-captured video comprising video and voice data to provide a personal media content file;
    securely uploading the personal media content file to remote, secure computer storage;
    receiving by the client device, one or more annotation comments that are feedback that are embedded in the personal media content; and
    rendering the uploaded personal media content on a display of the client device with the received annotations rendered as an overlay on the personal media content rendered from the personal media content file, with the annotation comments rendered at one or more timelines of the media that synchronizes the annotation comments with corresponding portions of the media at that one or more timelines.

7. The method of claim 6 wherein the positioning outline template produces an outline of a desired position of the user relative to a presentation, and the method further comprises:
    depicting positioning instructions as text on the display according to a position of the outline template relative to images of the user.

8. The method of claim 6 further comprising:
    receiving credentials for a selection of recipients for which the produced media can be shared;
    securely uploading the produced media file and the credentials of the selection of recipients to the secure server to share the media content with specified recipients;
    receiving a request to share the produced media file; and
    authenticating the request by determining that the request is from a user in the selection of users for which credentials were received.

9. The method of claim 6 further comprising:
    receiving a selection of a locally stored set of one or more presentation slides; and
    incorporating into the media content the selected one or more presentation slides into images of the media content.

10. A system comprises:
    a processor;
    memory storing a computer program product, the computer program product comprising instructions for causing the processor to:
    generate a positioning outline template that is rendered on a display of a user device to assist a user to align a video capture device with an image of the user to self capture video of the user;
    capture the self-captured video and voice media to produce a media file of the user;
    securely upload the produced media file to a secure server;
    receive from the secure server, the produced media file that includes one or more annotation comments that are rendered as an overlay on the media rendered from the produced media file, with the annotation comments rendered at one or more timelines of the media that synchronizes the annotation comments with corresponding portions of the media at that one or more timelines.

11. The system of claim 10 wherein the computer program product further comprises instructions to:
    receive credentials for a selection of recipients for which the produced media file can be shared;
    securely upload the produced media file and the credentials of the selection of recipients to the secure server.

12. The system of claim 10 wherein the computer program product further comprises instructions to:

execute a search for video files on the database server according to search terms derived from the one or more annotation comments.

13. The system of claim 10 wherein the computer program product further comprises instructions to:
receive a selection of a locally stored set of one or more presentation slides;
incorporate into media content, the selected one or more presentation slides into images of the media content.

14. A system comprises:
a processor;
memory storing a computer program product for coaching, the computer program product comprising instructions for causing the processor to:
receive from a user device, a media file including video and audio data;
apply a set of batch processes to the received media file to extract from the video and audio data description information from terms and/or codes;
distribute the received media file including the video and audio data to other user devices;
receive one or more annotations pertaining to the video and audio data in the distributed media file from at least one of the other user devices;
associate the received one or more annotations with the video and audio data in the media file, at one or more timelines of the video and audio data in the media file, which synchronizes the received one or more annotations with one or more corresponding portions of the video and audio data in the media file at the one or more timelines;
store and index the media file according to descriptive information with the received annotations;
receive credentials for a selection of recipients for which the produced media file can be shared;
receive a request to share the produced media file; and
authenticate the request by determining that the request is from a user in the selection of users for which credentials were received.

15. The system of claim 14 wherein the received selection of recipients further comprises:
receiving privileges required for users to view the annotations with the stored media file.

16. The system of claim 14 wherein the processor is configured by the program to:
receive a request to view a stored media file from a potential viewer;
determine whether the potential viewer has sufficient privileges to view the requested stored media file.

17. The system of claim 14 wherein the processor is configured by the program to:
receive a request to view a stored media file from a potential viewer;
determine whether the potential viewer has sufficient privileges to view the requested stored media file and annotations produced from other users.

18. The system of claim 14 wherein the set of batch processes executed by processor, configure the processor to:
extract the descriptive information from the media file;
analyze the extracted information to produce a set of terms;
determine whether the extracted information can be used as search terms; and
produce a set of search terms from those extracted terms that can be used as search terms according to the analysis.

19. A computer program product tangibly stored on a computer readable hardware storage device, the computer program product comprising instructions for causing a processor to:
receive from a user device, a media file including video and voice data;
apply a set of batch processes to the received media file to extract from the video and audio data description information from terms and/or codes;
distribute the received video and voice media to other users, according to privileges presented by the other users;
receive one or more annotations pertaining to the distributed media file from at least one of the other users;
associate the received one or more annotations with the video and voice data in the media file at one or more timelines of the video and voice data in the media file, which synchronizes the received one or more annotations with one or more corresponding portions of the video and voice media at that one or more timelines; and
store and index the media file according to the descriptive information with the received overlaid annotations.

20. The computer program of claim 19 further comprising instructions to:
receive a selection of recipients for which the media file can be shared; and
securely upload the media file and the selection of recipients to the server to share the personal media content with the specific recipients.

21. The computer program of claim 19 further comprising instructions to:
receive a request to view a stored media file from a potential viewer;
determine whether the potential viewer has sufficient privileges to view the requested stored media file.

22. The computer program of claim 19 further comprising instructions to:
receive a request to view a stored media file from a potential viewer;
determine whether the potential viewer has sufficient privileges to view the requested stored media file and annotations produced from other users.

* * * * *